(No Model.)

R. A. BOUDREAUX.
CULTIVATOR.

No. 534,134. Patented Feb. 12, 1895.

WITNESSES:
William Goebel
C. Sedgwick

INVENTOR
R. A. Boudreaux
BY
Munn & Co
ATTORNEYS.

UNITED STATES PATENT OFFICE.

RENE ACHILLE BOUDREAUX, OF PUGH, LOUISIANA.

CULTIVATOR.

SPECIFICATION forming part of Letters Patent No. 534,134, dated February 12, 1895.

Application filed February 28, 1894. Serial No. 501,849. (No model.)

*To all whom it may concern:*

Be it known that I, RENE ACHILLE BOUDREAUX, of Pugh, in the parish of Lafourche and State of Louisiana, have invented a new and Improved Cultivator, of which the following is a full, clear, and exact description.

My invention relates to an improvement in cultivators adapted for the cultivation of sugar cane, corn, cotton and other crops planted in rows, and the object of the invention is to provide a cultivator which will simultaneously ridge the crops and break up the soil of the rows.

A further object of the invention is to provide an implement of the above description which will be exceedingly simple, durable and economic in its construction.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
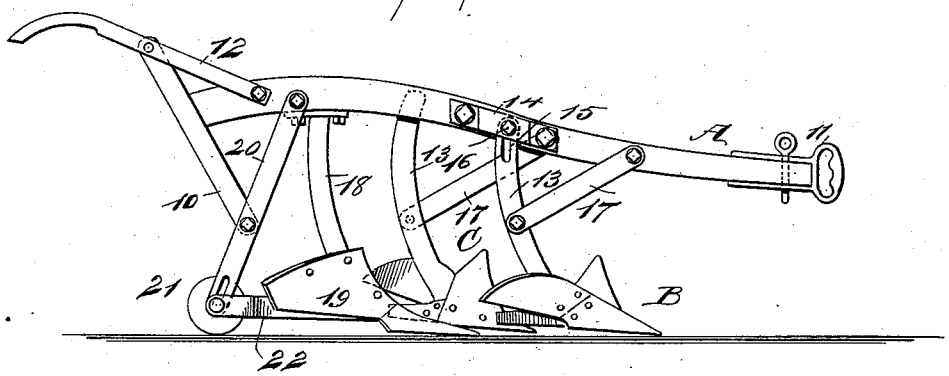
Figure 2:
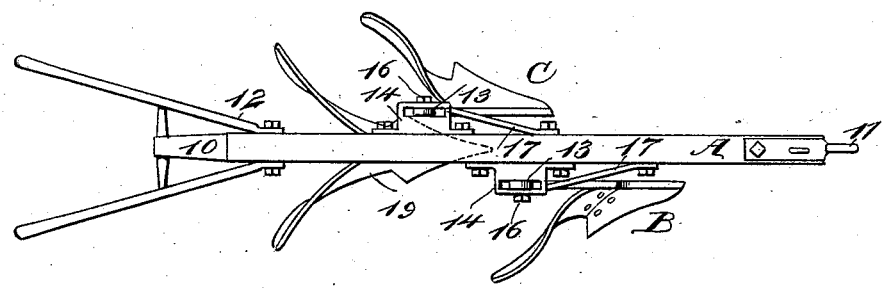
Figure 3:
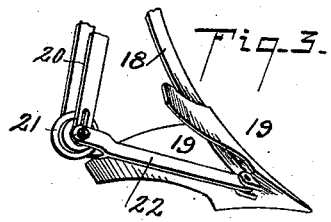

Figure 1 is a side elevation of the cultivator, and Fig. 2 is a plan view thereof. Fig. 3 is a detail view hereinafter referred to.

In carrying out the invention a beam A is employed, similar to a plow beam, provided at its heel with a diagonal bar 10, extending both above and below the beam, and the said beam is further provided with a suitable clevis 11 at its forward end and handles 12 at its heel for the manipulation of the implement.

Two plows B and C are employed, located one in advance of the other and one at each side of the beam, the landsides of the plows facing inward, and the shanks 13 of these plows are connected with the beam A in an adjustable manner, said shanks being capable of being raised and lowered to regulate the depth that the plows should travel in the ground. The plows are held a predetermined distance outside of the beam preferably by attaching to the sides of the beam bearings 14, extending at right angles from its sides; and the shanks are provided at their upper ends with slots 15, suitable bolts 16 being passed through the slots of the shanks and into the said bearings; and in order that the shanks may be braced against the forward movement of the implement, bars 17 are attached to the shanks and to the beam in advance of the point of attachment of the shanks thereto.

Near the heel of the beam A a third shank 18, is projected downward from its under side, the said shank when viewed from the front of the implement being midway of the two forward shanks 13; and the shank 18 has secured to it a sweep 19 of any approved construction, adapted to travel in the middle of a row. Arms 20, are projected downward from the beam A at the rear of the rear shank 18 in a rearwardly direction, and between the lower ends of the said arms a colter or disk 21, is journaled in slots produced in the said arms, the pivot bolt or axis of the said colter or disk being mounted in the rear bifurcated end of a horizontally located bar 22, pivotally attached as shown in Fig. 3 to the rear central portion of the sweep.

The bar 22 being pivoted at its forward end, its rear end may be raised and lowered to bring the colter to the desired height where it may be held by tightening the nut on its pivot bolt.

The colter will travel in the central furrow between the rows and assist in holding the plows to their work.

In cultivating with this form of plow a small single plow, or other equivalent cultivator is first run through the row of plants to be cultivated, after which the improved cultivator is employed, and by its means the side plows B and C will hill or ridge the earth around the roots of the plants, while the sweep 19 will break up the center of the row between the plants.

Thus the improved cultivator will perform work which would otherwise necessitate two or more plowings by the ordinary plow or cultivator.

Having thus described my invention, I claim as new and desire to secure by Letters Patent—

1. In a cultivator, the combination, with a beam, means for guiding the same, and vertically slotted brackets or bearing blocks 14, having transverse bolts 16 located at opposite sides of the said beam, one in advance of the other, of plows the shanks of which are slotted at their upper ends and passed through the slots in said bearings, the land sides of the plows facing inward, and the bearings extending a predetermined distance outward from the beam, and a sweep the shank of which is located at the rear of the said bearings and projected downward from the beam near its rear end, the latter shank being provided with a sweep located centrally between the plows, as and for the purpose specified.

2. In a cultivator, the combination, with a beam, means for guiding the same, and bearings located at opposite sides of the said beam, one in advance of the other, of plows the shanks of which are adjustably connected with said bearings, the land sides of the plows facing inward and the bearings extending a predetermined distance outward from the beam, and a sweep the shank of which is located at the rear of the said bearings and projected downward from the beam near its rear end, the latter shank being provided with a sweep located centrally between the plows, slotted arms projected downward in a rearwardly direction at the rear of the rear shank, a bar projected rearwardly from the sweep, and pivoted thereto and a colter carried by the rear bifurcated end of said bar, having its axis adjustable vertically in the said arms, as and for the purpose specified.

RENE ACHILLE BOUDREAUX.

Witnesses:
 THEOPHILE BOUDREAU,
 PIERRE J. GILBERT.